US008294587B2

(12) United States Patent
Danz et al.

(10) Patent No.: US 8,294,587 B2

(45) Date of Patent: Oct. 23, 2012

(54) SMOKE DETECTOR AND METHOD OF CHECKING BLOCKAGE OF ITS SMOKE HOLES

(75) Inventors: Michael Danz, Hattingen (DE); Sebastian Schnepel, Essen (DE); Gerhard Niederfeld, Essen (DE)

(73) Assignee: ista International GmbH, Essen (DE)

( * ) Notice: Subject to any disclaimer, the term of this patent is extended or adjusted under 35 U.S.C. 154(b) by 382 days.

(21) Appl. No.: 12/791,159

(22) Filed: Jun. 1, 2010

(65) Prior Publication Data

US 2010/0328082 A1 Dec. 30, 2010

(30) Foreign Application Priority Data

Jun. 29, 2009 (DE) ......................... 10 2009 031 099

(51) Int. Cl.

*G08B 17/00* (2006.01)
*G08B 19/00* (2006.01)
*G08B 23/00* (2006.01)
*G01N 21/00* (2006.01)
*G01N 37/00* (2006.01)

(52) U.S. Cl. ........ 340/589; 340/584; 340/628; 340/522; 340/539.26; 340/517; 356/438; 73/28.01; 73/31.01

(58) Field of Classification Search .................. 340/589, 340/584

See application file for complete search history.

(56) References Cited

U.S. PATENT DOCUMENTS

2005/0173638 A1* 8/2005 Powell ....................... 250/341.1
2007/0124955 A1* 6/2007 Crnkovich ...................... 34/402
2009/0206048 A1* 8/2009 Wada .............................. 212/71

* cited by examiner

*Primary Examiner* — Jennifer Mehmood
*Assistant Examiner* — Fekadeselassie Girma
(74) *Attorney, Agent, or Firm* — Andrew Wilford

(57) ABSTRACT

A smoke detector has a housing, a smoke sensor in the housing capable of detecting smoke therein, and an alarm connected to the sensor signaling when the smoke sensor detects smoke. A partition subdivides the housing into separate first and second chambers, and the housing is formed with first and second smoke holes allowing air from the exterior into the first and second chambers. The partition has a sensor port provided with a sensor for detecting air flow through the sensor port and a fan port having a fan for drawing air from one of the chambers and forcing it into the other chamber. A controller connected to the fan and to the air-flow sensor operates the fan means to move air from the one chamber through the fan port into the other chamber and generates an output when air flow through the sensor port exceeds a predetermined limit.

23 Claims, 1 Drawing Sheet

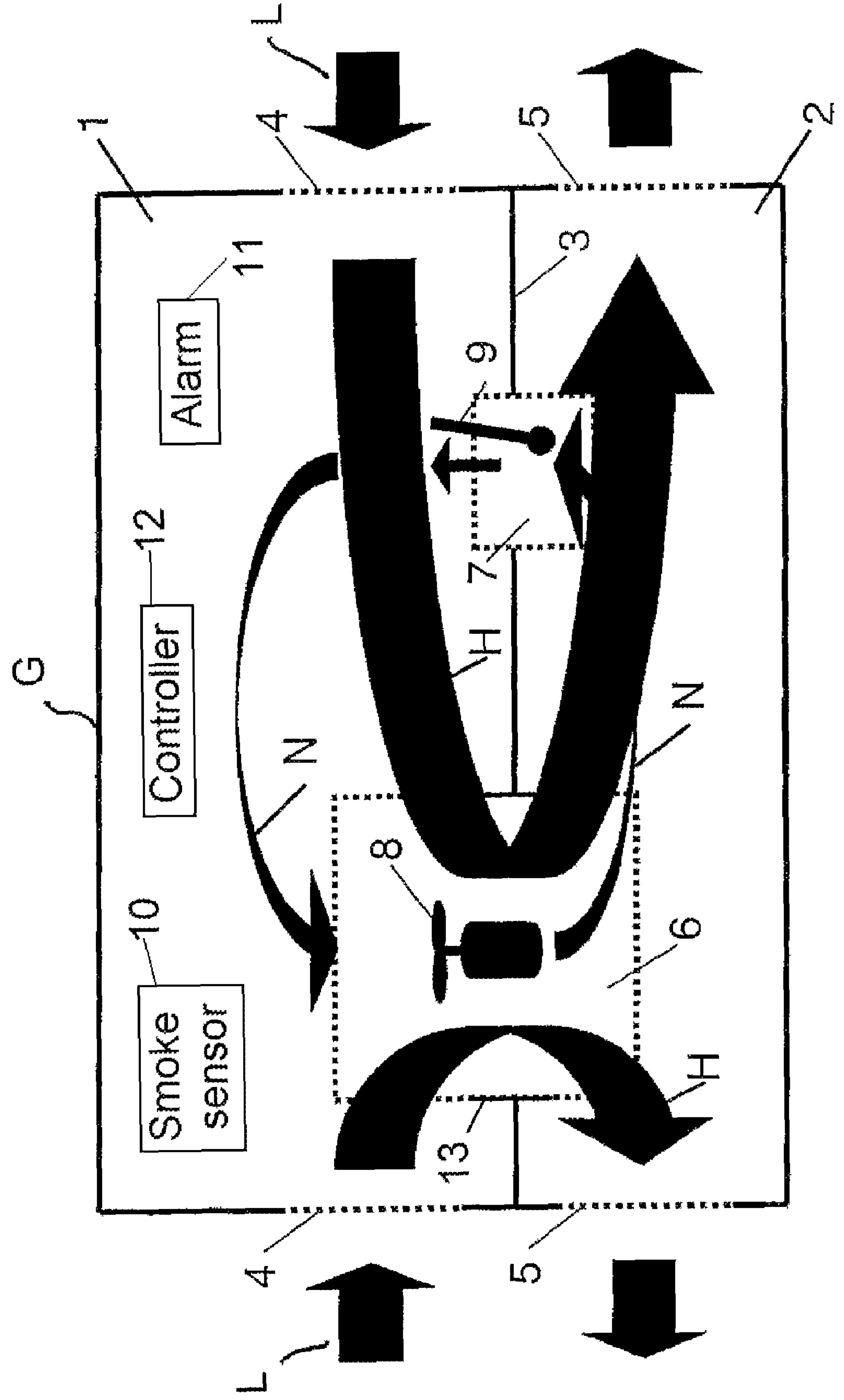
Alarm
11
Controller
12
Smoke sensor
10
G
1
2
3
4
5
6
7
8
9
13
L
H
N

SMOKE DETECTOR AND METHOD OF CHECKING BLOCKAGE OF ITS SMOKE HOLES

FIELD OF THE INVENTION

The present invention relates to a smoke sensor. More particularly this invention concerns a method of checking blockage of the smoke holes of such a detector.

BACKGROUND OF THE INVENTION

The invention relates to a smoke detector with a housing formed smoke-admitting holes and having a smoke sensor and an alarm. The invention relates further to a method of checking whether the smoke holes of the detector are blocked.

Smoke detectors are known from the prior art and typically comprise a smoke sensor that can for example have an optical detection path and an alarm and that are held in a housing. Such a housing is typically mounted to a room ceiling to be able to reliably detect smoke caused by a fire. To this end, such a housing can be subdivided for example into a base that is secured to the ceiling and a cover on the lower room side that are joined together after the base is mounted to the ceiling.

For example, with an optical detection path implemented, for example, by a light-emitting element and a scattered-light sensor, it is possible to reliably detect when smoke enters the housing through the smoke holes and into the optical detection path causing light scattering therein. When this happens an alarm is triggered, which alarm can be for example be acoustic, to which end such a smoke detector of the known kind can comprise a suitable acoustic sound generator for example a piezoelement.

Besides the above-mentioned devices, smoke detectors of this known kind thus can typically comprise suitable electronics that measure the scattered light by means of a scattered light sensor to control the alarm.

It is further known from the prior art that smoke holes can be fouled or blocked so that a reliable detection of smoke can no longer be ensured. Contamination of the smoke holes can take place, for example, by dust in the air which is deposited over time in the smoke holes, or by insects such as for example spiders, or by other mechanisms. When the hole cross-section is reduced, the passage of smoke through the smoke holes is throttled and the response time of the blocked smoke detector is extended.

Smoke holes of a smoke detector can also be intentionally closed by persons. This can happen when smoke detectors are covered for example during renovation work as when painting a ceiling. In such a situation, a smoke detector is no longer reliably functional.

Furthermore, it is or will be required in the future that the proper function, therefore in particular clear smoke holes, be regularly to be checked to ensure the function capability of a smoke detector. An obligation to check concerns, for example, the operators of smoke detection systems but also the landlords of residential property where smoke detectors are installed.

The methods or smoke detectors known in the prior art all have the disadvantage that usually indirect measuring methods are used to check for free passage or the throttling degree of smoke holes.

To this end, acoustic or optical methods are frequently is used to be able to detect the contamination by measuring techniques, such methods or smoke detectors being proven to be unreliable in some cases, in particular in case of methods using acoustic measurement, in particular resonance measurement, because the acoustic behavior of a smoke detector can change not only by blockage of the holes themselves but also by internal dirt deposits in the housing of the smoke detectors or by mechanical damage of the housing which otherwise do not influence the functional capability of a smoke detector at all.

OBJECTS OF THE INVENTION

It is therefore an object of the present invention to provide an improved smoke detector and method of checking blockage of its smoke holes.

Another object is the provision of such an improved smoke detector and method of checking blockage of its smoke holes that overcomes the above-given disadvantages, in particular by means of which the degree of blockage of smoke holes in the housing of a smoke detector or their throttling degree when smoke passes through can be checked in a reliable manner and also in a simple manner.

Preferably, the possibility is provided that the result of a check is made accessible, in particular without the need that inspection personnel have to enter the installation location of a smoke detector.

SUMMARY OF THE INVENTION

A smoke detector has according to the invention a generally closed housing, a smoke sensor in the housing capable of detecting smoke therein, and an alarm connected to the sensor for generating an alarm when the smoke sensor detects smoke. A partition subdivides the housing into separate first and second chambers, and the housing is formed with first and second smoke holes allowing air from the exterior into the first and second chambers. The partition has a sensor port provided with a sensor for detecting air flow through the sensor port and a fan port having a fan for drawing air from one of the chambers and forcing it into the other chamber. Thus when the smoke hole of either chamber is at least partially blocked air flow through the sensor port will be greater than when it is not partially blocked. A controller connected to the fan and to the air-flow sensor operates the fan means to move air from the one chamber through the fan port into the other chamber and generates an output when air flow through the sensor port exceeds a predetermined limit. This output indicates blockage of the smoke holes, indicating that the smoke detector should be cleaned or serviced.

Thus the method of this invention basically comprises subdividing the interior of the smoke-detector housing into two chambers each open through smoke holes to the exterior. An air flow is induced from one chamber to the other and a sensor in another port in the partition detects flow from the other port back into the one port. When the smoke holes are relatively unblocked or unobstructed, the other port will never be significantly pressurized, as air blown by the fan into it from the one chamber will simply exit through the smoke holes. When, however, the smoke holes of the other chamber are blocked, this chamber will pressurize somewhat and flow through the sensor prot will increase. Similarly if the smoke holes of the one chamber become at least partially blocked, the fan will pull more air into the one chamber through the sensor port, which increased air flow can again be detected. Thus blockage of the ports of either chamber is easily detected.

In a preferred system the main air flow through the fan port enters from outside through the smoke holes of the one chamber of the housing and exits the housing through the smoke holes of the other chamber. In case of a fire, this means that the detector will be particularly sensitive in that it will draw in ambient smoke-filled air and will rapidly respond.

It is not really critical which of the two chamber acts as the "intake" chamber and which acts as the "output" chamber. The system will function adequately either way.

The substantial advantage of the method according to the invention is that in fact a variable is measured, namely a flow of air that is directly influenced by the blockage degree or throttling degree of the smoke holes but not by potential other changes which are made to the smoke detector or which occur over time.

Here, by at least temporarily or periodically powering the fan, for example by means of a controller, a total air flow is generated. This total air flow is composed of a main flow and a secondary flow which, as mentioned earlier, are guided or result from a design-related air guidance.

For maintaining the total air flow, the secondary air flow increases when the main air flow decreases which can happen by blockage of the smoke holes and the resulting throttling of the air flow in the main air flow. Therefore, an increasing secondary air flow or the strength of the secondary air flow, thus the flow velocity of the same, can directly form a measure for the blockage or throttling of the smoke holes. Such a measure can thus be identified or stored for future evaluations or messages for the purpose of checking the functional capability or reliability of the smoke detector.

The smoke detector reports its blockage for example by a signal (optical/acoustic) or a message to a control center when the flow in the secondary air flow exceeds a predetermined limit.

Such a limit value can be stored, for example, in the smoke detector. In one application, the limit value of such a smoke detector can be determined and stored at start-up by determining the strength of the secondary air flow of the new clean smoke detector during the first start and storing it as limit value for later comparisons.

For the essential central idea of the invention the secondary air flow occurs exclusively inside the housing so as to ensure a perfect dependence on the main air flow without any further interference.

To achieve a corresponding air guidance that can ensure this, the air guidance is defined by a partition by means of which the interior of the housing is divided in two chambers, and by a fan port in the partition in which the fan is arranged, and at least a sensor port in the partition which, in the same way as the first one, connects the two chambers.

A smoke detector according to the invention that can carry out the method according to the invention thus has the features that the interior of the housing is divided by a partition into two chambers, that the first chamber comprises the smoke holes, and the second chamber comprises at least one hole (outlet or inlet hole, depending on the air flow direction in the main air flow) which connects the second chamber with the environment.

In the partition, one fan port and at least one sensor port are arranged, each of them connecting the two chambers. In the fan port, an at least temporarily actuatable/actuated fan is provided by means of which a total air flow through the fan port in the partition can be generated that is divided into a main air flow through the smoke holes that connect the second chamber with the environment, and a secondary air flow between the chambers and through the fan and the at least one sensor port, a sensor element being provided with which the strength of the secondary air flow can be measured, which strength, as mentioned earlier, depends on the blockage degree of the smoke hole(s).

As mentioned above, two alternative flow directions for the main air flow can be provided or selected, if necessary by an ability to switch the fan's rotating direction, namely preferred from outside through the smoke hole to the fan port, and from there to the at least one hole in the second chamber to the environment, wherein this hole then serves as outlet hole or vice versa, the at least one hole then serving as inlet hole.

The air-flow sensor is arranged in or in the region of the at least one sensor port. This arrangement is particularly preferred because specifically in the region of the at least one sensor port, a maximum flow velocity is obtained due to the maximally achieved cross-section reduction in the hole. Therefore, the measuring accuracy is at its highest at this point.

In a further preferred embodiment a smoke detector is a two-piece construction, wherein in such a case, as a possible embodiment, the mentioned second chamber is in a base, i.e. the part that is mounted to the ceiling of a room, and the first chamber is allocated to a cover of the housing that, thus, is mounted on the room side. However, other constructions are also conceivable here, in particular one-piece housing constructions.

For measuring the strength of the secondary air flow, principally any suitable sensor element can be used. For example, in one embodiment there is a possibility to insert a rotor into the sensor port, which rotor is set into rotation by the secondary air flow running through the sensor port. Thus by measuring the rotational speed of the rotor for example optically by means of a light barrier or by voltages induced in a generator driven by the rotor, the strength of the secondary air flow can be measured.

Moreover, it is possible to measure the pressure difference between the two chambers with a pressure sensor. With the given geometry of the port, the pressure difference too is dependent on the flow velocity in the secondary air flow.

In another embodiment that is further preferred, the air-flow sensor is equipped to measure the temperature profile of a heated means cooling in the secondary air flow. From the temperature profile measured with the air-flow sensor, a measure for the strength and hence for the blockage or throttling of the smoke holes can then be determined. As a means to be heated or as a heated means, for example, the air-flow sensor itself, the flowing secondary air or a separate element can be used.

In one embodiment, an air-flow sensor can be configured for example as a temperature-dependent resistor, for example as a resistor with a negative temperature coefficient (NTC). Such an air-flow sensor or other non-movable air-flow sensors have the particular advantage that no friction must be overcome as is the case when setting the above mentioned rotor into rotation. Such a rotor can detect flow velocity in a sufficient manner only above a certain strength because goes from standstill into rotation only above such a minimum strength.

In contrast thereto, the preferred air-flow sensor which for example is configured as a temperature-dependent resistor, is independent of any friction effects to be overcome so that even the lowest flow velocities can be reliably measured.

To measure the strength of the secondary air flow by measuring the cooling behavior of a heated means, a heating device can be used that is arranged in the housing for example in one of the two chambers or in a port. Such a heating element can be arranged separately, in particular adjacent the air-flow sensor for example if it is provided to heat the air-flow sensor itself or the flowing secondary air. In one embodiment, the air-flow sensor itself can form the heating device for example as a temperature-dependent resistor that is temporarily supplied with power. Such a resistor will heat up to a certain temperature due to the power supply and can subsequently be cooled by the secondary air flow.

For all these embodiments there is hence the possibility of measuring during cooling the resistance value of this temperature-dependent resistor as a function of time and to obtain from the parameter measured in this manner information about the cooling behavior and thus about the strength of the secondary air flow and thus, at the same time, about the blockage of the smoke holes.

In order to carry this out, a suitable control and/or measuring means can be provided within the smoke detector by means of which the heating of the used means is carried out for example the heating of a separate heating device or the power supply to the air-flow sensor, and/or the subsequent measuring of the cooling behavior, in particular the measuring of the resistance value as a function of time.

To this end, in a possible embodiment the measurement of the cooling behavior or at least the evaluation of the measurement values does not start directly after completion of a heating process, but that the measuring device first waits for a certain time because after the heating of the air-flow sensor, in particular of the temperature-dependent resistor, first cooling by means of radiation dominates over the cooling behavior due to convection caused by the secondary air flow.

Therefore, in an advantageous manner the measuring device is set up in such a manner that it waits for the length of the time during which the cooling behavior is dominated by the heat radiation.

In yet another configuration, before carrying out a measurement as described above, the fan is switched on for a specified/specifiable time to obtain a thermal and/or hydrothermal balance within the smoke detector without heating, thus before the actual measuring phase. Then, in an alternative, the measuring process, i.e. the heating can be carried out directly when the fan is running or, in a variant which is preferred with respect to this, only after the fan has been stopped for, again, a specified/specifiable time. Heating thus takes place when the fan is not running, wherein after the heating, the fan is then started again for a predetermined measuring time for example until a certain limit value (temperature or resistance) is reached in the course of the temperature.

Independent of these embodiment variants, heating can also be carried out when the fan is running.

To ensure that the formation of a measurable secondary air flow is not subject of major internal resistance, in a further preferred design of the smoke detector, instead of only one single sensor port, at least two sensor ports are provided, the air-flow sensor for determining the strength of the secondary air flow being in one of the at least two ports. Thus, by the arrangement of the air-flow sensor, for example of the resistor, in one of the two ports, the cross-section of this port is reduced, but, due to the at least one further port, sufficient further cross-section remains to obtain a significant secondary air flow.

According to the invention, in a further embodiment a controller in the smoke detector is used that is equipped to supply at least temporarily or periodically power to the fan in order to check the blockage of the smoke holes. This can be carried out, for example, periodically, in particular automatically for example by an internal program within the smoke detector.

In another embodiment there is the possibility of carrying out the blockage test of the smoke holes, i.e. to supply power to the fan and evaluate the result of the air-flow sensor in a triggered manner for example by an external request. Such a request, for example, can be initiated by maintenance personnel in the vicinity of the smoke detector or can be initiated remotely for example by a request that is communicated to the smoke detector via radio, for which the detector can have a suitable radio receiver.

The smoke detector can also have a communication system, for example a system which allows the reception of the above-mentioned text request and by means of which the result of the measurement of the strength of the secondary air flow and hence a measure for the blockage of the smoke holes can be reported to an external receiver unit for example to a management system. Such reporting can be carried out via cable, but particularly preferred wirelessly.

Thus, there is always the possibility for responsible personnel, for example, the landlords of residential properties, to perform a check of smoke detectors without the need that these persons have to enter the premises in which one or more smoke detectors are installed.

A further advantageous embodiment of the smoke detector and the method according to the invention is seen when the fan in the housing of the smoke detector is also used, in addition to its purpose to check for blockage, to suck at least temporarily ambient air into the housing for example to prevent false alarms or to improve the responding behavior.

According to this, a controller can be configured to initiate such air intake when a detection takes place in the detection path. This sucking-in can take place before triggering an external alarm to check if this detection is of short duration only for example in case of cigarette smoke or an insect or dust/aerosol etc., or if more smoke follows.

During such a detection or a detection that was initially triggered internally and a subsequent power supply to the fan, ambient air is then actively sucked into the smoke detector. In case of an insect or of a small cloud of for example cigarette smoke, dust etc., the smoke detector will thus detect with its for example optical detector that no smoke is present from a fire. In this case no alarm is initiated, in particular from an external alarm, and after discontinuation of the detection by the smoke sensor the fan is switched off again. Only when, during operation of the fan and active suction of ambient air, the smoke sensor still detects smoke, is an external alarm for example an acoustic signal and/or communication to an emergency alarm center initiated.

To achieve an effective total air flow in a smoke sensor and an advantageous division in main and secondary air flow, furthermore, the port in which the fan is arranged is given by the inner free cross-section of a cylindrical tube section fitted in the partition and holding the fan.

Furthermore, the fan port and the at least sensor port are spaced apart relative to the diameter of the normally circular and planar partition. This way, a maximum distance between the two ports can be achieved to ensure that a clear division of the total air flow into main and secondary streams low is achieved.

In a further embodiment the fan can blow the smoke hole free of blockage. For this, preferably, a rotational direction of the fan is selected which causes that the main air flow is directed from the interior of the housing through the smoke holes to the outside so that dirt is blown out of the smoke detector. Here, the fan can be operated in such a manner that it rotates faster than during a blockage test.

The fan can be reversible by suitably the controller. Here, a measurement of the blockage can be carried out in the one rotational direction and cleaning in the other rotational direction. There is also the possibility to carry out the measuring of the blockage or the throttling of the smoke holes in both rotational directions.

BRIEF DESCRIPTION OF THE DRAWING

The above and other objects, features, and advantages will become more readily apparent from the following description, reference being made to the accompanying drawing whose sole FIGURE is a diagrammatic illustration of the invention.

SPECIFIC DESCRIPTION

As seen in the drawing a smoke detector has a housing G in which is provided a standard smoke sensor 10 and alarm 11, in particular as an optical detection path with light transmitter and scattered light receiver, and, for example, an acoustic sound generator. The housing G is internally divided by a partition into, as shown here, an upper chamber 1 and a lower chamber 2 by a partition 3, although the up/down orientation is irrelevant and in fact the chambers 1 could even be horizontally next to each other. In addition the housing G is formed with two sets of smoke holes 4 at opposite ends of the chamber 1 and two more sets of smoke holes 5 at opposite ends of the chamber 2.

This partition 3 is provided with a fan port 6 in which a fan 8 is provided and, spaced along the partition 1 therefrom, a sensor port 7 in which or adjacent to which a gas-flow sensor 9 is provided. When the fan 8 is powered, normally electrically and periodically by means of an internal or remote controller 12, an air flow is created that, in this embodiment, passes from the chamber 1 through the port 6 into the chamber 2. In doing so, the flow splits up into a main air flow H and a secondary air flow N. The fan port 8 is formed by a cylindrical collar 13 fitted through the partition 3 and holding the fan 8

The main air flow H is formed by ambient air L drawn in through the smoke holes 4 into the chamber 1. This ambient air is conveyed by the fan 8 as a part of the total air flow through the port 6 and exits again due to pressurization from the chamber 2 through the holes 5, which acts here as outlets 5, out of the chamber 2 into the surrounding environment. With reversed rotation of the fan 8, the flow direction is reversed as well, and the hole 5 would act as an intake. All following embodiments apply to the alternative flow direction in an analog manner. At the same time, in addition to this external main air flow, an internal secondary air flow N is created whereby air is conveyed in a circle between the two chambers 1 and 2, this circular flow going back and forth between the two chambers 1 and 2 through the port 6 in which the fan is mounted as well as through the port 7 with the gas-flow sensor 9. The discussion of main and secondary flow is actually theoretical since in practice the air of the main flow mixes with the air of the secondary air flow and separates again.

What is important is that the total air flow, which results substantially from the rotational speed of the fan and the internal flow resistances, is generally constant so with a decreasing main air flow for example by a cross-section reduction or clogging of the smoke holes 4, the flow velocity in the secondary air flow N increases.

Thus the degree of blockage or throttling of the main air flow is proportional to the flow velocity of the secondary air flow N that, as shown here, can be measured by the sensor 9 in or near the sensor port 7. As described in the general part, this can involve, for example, a temperature-dependent resistor whose cooling or resistance change over time after a heating by means of power supply can be measured. Alternately a heater 13 can be provided at a third port 7' through the partition to heat air in the housing G.

The flow velocity measured in this manner is proportional to the blockage of the smoke holes 4 and an output corresponding to this measurement can be stored, for example, in all possible embodiments of the invention within the smoke detector and/or can be communicated to the outside for example wirelessly so as to be able to document a check for function and free passage of the smoke detector's smoke gas inlet holes.

Since, as shown FIG. 1, the fan 8 not only generates an internal recirculation but in particular causes ambient air L to be drawn through the smoke gas inlet holes 4 into the chamber 1 and thus into the interior of the housing G, the invention can also be used to shorten response times or to exclude false alarms by a temporary detection of foreign particles within the e.g. optically configured detection path.

Actively sucking in ambient air can check if after a detection of particles such as, for example, smoke particles in the detection path, further particles follow with the sucked-in air and thus if a fire really exists or there was only a temporary smoke condition.

We claim:

1. A smoke detector comprising: a generally closed housing; a smoke sensor in the housing capable of detecting smoke therein; alarm device connected to the smoke sensor for generating an alarm when the smoke sensor detects smoke; a partition subdividing the housing into separate first and second chambers, the housing being formed with first and second smoke holes respectively allowing air from the exterior into the first and second chambers; a fan port in the partition; a sensor port in the partition spaced from the fan port; air-flow sensor device at or in the sensor port for detecting air flow through the sensor port; fan device in the fan port for drawing air from one of the chambers and forcing it into the other chamber, whereby, when the smoke hole of either chamber is at least partially blocked, air flow through the sensor port will be greater than when it is not partially blocked; and control device connected to the fan device and to the air-flow sensor device for operating the fan device to move air from the one chamber through the fan port into the other chamber and for generating an output when air flow through the sensor port exceeds a predetermined limit.

2. The smoke detector defined in claim 1 wherein the air-flow sensor device measures a pressure differential between the chambers or a speed of air flow through the sensor port.

3. The smoke detector defined in claim 1 wherein the air-flow sensor device includes a heatable element exposed to air flow through sensor port and device for detecting the temperature of the heatable element.

4. The smoke detector defined in claim 1 wherein the air-flow sensor device is a temperature-dependent resistor with a negative temperature coefficient or is a movable element exposed in the sensor port.

5. The smoke detector defined in claim 1 wherein the sensor device includes a heater and device for detecting cooling of the sensor device for comparing a cooling rate thereof with a temperature curve.

6. The smoke detector defined in claim 5 wherein device for detecting waits a predetermined time after heating of the sensor device to operate.

7. The smoke detector defined in claim 5 wherein the means for detecting waits until temperature has equalized in the detector before operating.

8. The smoke detector defined in claim 5 wherein the device for detecting operates only when the fan device is not operating.

9. The smoke detector defined in claim 1 wherein there is a third port in the partition.

10. The smoke detector defined in claim 1 wherein the controller periodically operates the fan and at the same time monitors an output of the air-flow sensor device.

11. The smoke detector defined in claim 1 wherein the control device is connected between the smoke sensor and the alarm and on detection of smoke by the sensor suppresses emission of an alarm, runs the fan device, and only allows the alarm to be generated when more smoke is detected after running the fan device.

12. The smoke detector defined in claim 1 wherein the control device can transmit a signal to a remote monitoring device when blockage of the smoke ports is detected.

13. The smoke detector defined in claim 1 wherein the control device emits an alarm when blockage of the smoke ports is detected.

14. The smoke detector defined in claim 1, further comprising a cylindrical collar defining the fan port and holding the fan device.

15. The smoke detector defined in claim 1 wherein the partition is generally circular and the ports are diametrally opposite each other.

16. A method of operating a smoke detector having a generally closed housing, a smoke sensor in the housing capable of detecting smoke therein, an alarm connected to the smoke sensor for generating an alarm when the smoke sensor detects smoke, the method comprising the steps of:

providing a partition subdividing the housing into separate first and second chambers and providing the housing with first and second smoke holes respectively allowing air from the exterior into the first and second chambers;

moving air through a fan port in the partition from one of the chambers to the other of the chamber;

sensing at a sensor port spaced from the fan port a flow of air forced from the other chamber back into the one chamber the movement of air through the fan port; and generating an output when air flow through the sensor port exceeds a predetermined limit.

17. The method defined in claim 16, further comprising the step of drawing air into the one chamber via the respective smoke hole and expelling it from the other chamber via the respective smoke hole on movement of air through the fan port.

18. The method defined in claim 17 wherein the housing is subdivided by a partition formed with the ports.

19. The method defined in claim 17 wherein air flow through the sensor port is detected by measuring cooling of a heated element.

20. The method defined in claim 17 wherein air flow is measured by displacing an element in the sensor port.

21. The method defined in claim 17, further comprising periodically moving air through the fan port to flush dust from the smoke detector and clear the smoke holes.

22. The method defined in claim 21 wherein the air is moved from the other chamber to the one chamber through the fan port to flush dust.

23. The method defined in claim 22 wherein the air is moved at high speed to flush dust.

* * * * *